United States Patent
Chabert et al.

(10) Patent No.: US 11,028,317 B2
(45) Date of Patent: Jun. 8, 2021

(54) ADDITIVES FOR ELIMINATING FRACTURING FLUIDS USED FOR OIL EXTRACTION

(71) Applicants: RHODIA OPERATIONS, Aubervilliers (FR); IFP ENERGIES NOUVELLES, Rueil-Malmaison (FR)

(72) Inventors: Max Chabert, Ivry sur Seine (FR); Eloise Chevallier, Bordeaux (FR)

(73) Assignees: RHODIA OPERATIONS, Aubervilliers (FR); IFP Energies Nouvelles, Rueil-Malmaison (FR)

( * ) Notice: Subject to any disclaimer, the term of this patent is extended or adjusted under 35 U.S.C. 154(b) by 0 days.

(21) Appl. No.: 16/614,956

(22) PCT Filed: May 18, 2018

(86) PCT No.: PCT/EP2018/063062
§ 371 (c)(1),
(2) Date: Nov. 19, 2019

(87) PCT Pub. No.: WO2018/211061
PCT Pub. Date: Nov. 22, 2018

(65) Prior Publication Data
US 2020/0208043 A1    Jul. 2, 2020

(30) Foreign Application Priority Data

May 19, 2017   (FR) ...................................... 1754449

(51) Int. Cl.
C09K 8/60     (2006.01)
C09K 8/68     (2006.01)
E21B 43/26    (2006.01)
E21B 43/22    (2006.01)

(52) U.S. Cl.
CPC ................ *C09K 8/602* (2013.01); *C09K 8/68* (2013.01); *E21B 43/26* (2013.01)

(58) Field of Classification Search
CPC .......... C09K 8/584; C09K 8/602; C09K 8/68; C09K 8/86; C09K 8/62; C09K 8/74; C09K 2208/30; C09K 2208/28; C09K 8/035; C09K 8/80; E21B 43/26; E21B 43/16; E21B 43/267
See application file for complete search history.

(56) References Cited

U.S. PATENT DOCUMENTS

2011/0220353 A1    9/2011  Bittner
2017/0051195 A1*   2/2017  Vanzin ................... C09K 8/584

FOREIGN PATENT DOCUMENTS

CN    106281287 A    1/2017
WO    2017034923 A1  3/2017

OTHER PUBLICATIONS

Machine translation of CN106281287A, Retrieved 2019.

* cited by examiner

*Primary Examiner* — Zakiya W Bates
(74) *Attorney, Agent, or Firm* — Osha Bergman Watanabe & Burton LLP

(57) ABSTRACT

A method for extracting a crude oil contained in a geological formation comprises a step of fracturing the geological formation, by injection of a specific aqueous extraction fluid under pressure, which contains at least one surfactant that reduces the interfacial tension between the extraction fluid and the crude oil to be extracted to below 0.1 mN/m; followed by a discharge step ("flowback"). Additionally, the original fracturing fluids used in this method, and the additives used in these fracturing fluids include a surfactant or a surfactant mixture which make it possible to reduce the interfacial tension between the fluid and a petroleum oil below 0.1 mN/m.

13 Claims, No Drawings

ADDITIVES FOR ELIMINATING FRACTURING FLUIDS USED FOR OIL EXTRACTION

This application is a U.S. national phase entry under 35 U.S.C. § 371 of International Application No. PCT/EP2018/063062, filed on May 18, 2018, which claims priority to French Application No. 1754449, filed on May 19, 2017. The entire contents of these applications are explicitly incorporated herein by this reference.

The present invention relates to the field of fracturing fluids employed for oil extraction, and more precisely to that of additives employed in these fracturing fluids in order to improve their evacuation (flowback) from geological formations (oil-yielding rocks or the like) where they are employed.

In the processes for fracturing geological (underground) formations used for oil extraction, and notably those employed for fracturing performed on unconventional wells drilled in formations of low permeability, for example those denoted by the term "tight oil" (very sparingly permeable to oil) or shale oil formations, fracturing fluids are injected at high pressure into the formation in order to create fractures therein allowing the extraction of the hydrocarbons according to a technique that is well known per se. Fracturing operations involve the use of large volumes of fracturing fluids (of the order of 10 000 $m^3$) and thus large amounts of water. This water introduced into the formation during fracturing is then evacuated from the formation (phase known as "flowback"), this flowback of the water generally taking place via the drilling well where it is evacuated with hydrocarbons.

In addition to the usual components of fracturing fluids (polymers, proppant, biocides, etc.), use is often (and almost systematically) made of specific additives ("flowback aids") in order to optimize the expulsion of the water, which usually serve, in practice, to expel in combination the hydrocarbons and the water during the "flowback" phase.

As flowback aids of the abovementioned type, it has been proposed to introduce various types of additives into fracturing fluids. Conventionally, it has been recommended to employ wetting agents, typically surfactant mixtures intended to treat the rocky surface of the reservoir and to facilitate the flow of the water and hydrocarbons. By way of example, examples that may be mentioned include the mixtures of amine oxide and of ethoxylated alcohols described in US 2013/0180723 or the surfactants described in US 2015/0300139.

More specifically, it has been proposed to employ fracturing fluids in the form of microemulsions, including water, surfactants and in general a solvent, for instance microemulsions of "Windsor IV" type described in WO 2016/041823 or US 2013/261033 (particular microemulsions in which the water, the solvent and the surfactants are in concentrations such that they form a single continuous phase). In this case also, the additives employed are employed as wetting agents.

The present invention is directed toward providing a new method which can improve the water and hydrocarbon flowback after fracturing operations.

To this end, the invention proposes to make use in fracturing fluids a new generation of flowback aids, namely additives which are not wetting agents of the type recommended hitherto, but surfactants which induce a drastically lower interfacial tension between the fracturing fluid and the hydrocarbons (typically reducing it by a factor of 10 or 100 relative to the interfacial tension obtained between the extraction fluid and the hydrocarbons with respect to the wetting agents generally recommended).

In the context of the studies which led to the present invention, the inventors have now demonstrated that obtaining a very low interfacial tension between the fracturing fluid and the petroleum oil to be extracted makes it possible to markedly improve the elimination of the fluid during the flowback phase. They have also discovered, unexpectedly, the reduction in the interfacial tension between the fracturing fluid and the petroleum oil to be extracted, which does not affect the capacity of the fluid to extract the oil during the flowback phase, whereas it might have been expected on the contrary that this reduction in the interfacial tension would lead to similar behavior of the oil and the fluid, with probable negative repercussions on the extraction.

More precisely, according to a first aspect, a subject of the present invention is a process for extracting petroleum oil contained in a geological formation, said process comprising at least one step (E1) of fracturing said geological formation, by injection under pressure into said formation of an aqueous extraction fluid comprising at least one surfactant which lowers the interfacial tension between the fracturing fluid and the petroleum oil to be extracted below 0.1 mN/m, and more preferentially below 0.05 mN/m, under the conditions of contact between the petroleum oil and the fluid during step (E1); followed by a step (E2) of at least partial flowback of the petroleum oil and the water out of the geological formation (typically, a water/oil mixture is recovered via the injection well into which the fracturing fluid was injected during step (E1), the oil then being able to be separated from the water/oil mixture via any means known per se).

The fracturing fluids that are useful according to the invention comprise particular surfactants (and usually mixtures of several types of surfactants), which are capable of very substantially lowering the interfacial tension between a fracturing fluid and a petroleum oil. For a given surfactant or a given surfactant mixture, the interfacial tension obtained between the fracturing fluid and the oil depends on the concentration, the nature of the oil, the salinity and the temperature. The fracturing fluid employed in the process of the invention comprises, as a result, a surfactant or a surfactant mixture suited to the oil to be extracted, which is employed in the fluid at a concentration making it possible to obtain the desired interfacial tension under the temperature and salinity conditions notably of step (E1).

According to another aspect, a subject of the present invention is fracturing fluids that are useful for performing the process comprising the abovementioned steps (E1) and (E2).

These particular fracturing fluids, developed in the context of the present invention, constitute a new type of fracturing fluids, which, inter alia, contain a particular surfactant or (usually) a particular mixture of surfactants, namely a surfactant or a surfactant mixture for which concentration, temperature and salinity conditions exist which make it possible to reduce the interfacial tension with a petroleum oil below 0.1 mN/m, and preferably below 0.05 mN/m, which is not the case for the wetting agents conventionally used as flowback aids. Preferably, these conditions are compatible with the majority of the conditions encountered during the fracturing step and it is thus preferred in particular to employ surfactants which make it possible to obtain the targeted reduction for the interfacial tension at least at a temperature of between 70 and 120°. The ability of a surfactant or of a mixture of surfactants to reduce the interfacial tension may be reflected by the interfacial tension obtained with model oils, for instance decane. Usually, a fracturing fluid according to the invention is not in the form of an emulsion or a microemulsion.

According to a particular aspect, the invention relates to specific fracturing fluids of the abovementioned type, which have never been described hitherto to the inventors' knowledge, namely fracturing fluids whose interfacial tension with decane is less than 0.1 mN/m, for example less than or equal to 0.07 mN/m, for example less than or equal to 0.05 mN/m at least at a temperature of between 70 and 120° C. (typically at 70 or 80° C.).

According to yet another aspect, a subject of the present invention is the use, as a flowback aid in an aqueous fracturing fluid, of at least one surfactant which is capable of lowering the interfacial tension of said fluid with decane below 0.1 mN/m, preferably at least at a temperature of between 70 and 120° C., for example at 70 and/or at 80° C.

For the purposes of the present description, the "interfacial tension" of a fracturing fluid with a petroleum oil or model oil, expressed in mN/m, denotes the interfacial tension as measured at a given temperature according to the rotating drop method which is well known per se. For further details, reference may notably be made on this subject to the article "*Measurement of interfacial tension from the shape of a rotating drop*". Princen H. M., Zia I. Y. Z., Mason S. G. J. Colloid Interface Sci. 23: 99-107 (1967).

The present invention thus proposes a new generation of fracturing fluid additives, for improving the process of flowback of the water and petroleum oil following fracturing, by drastically reducing the interfacial tension between the fracturing fluid and the petroleum oil to be extracted.

Preferably, the additives employed in the context of the present invention are surfactants or mixtures of surfactants which induce an interfacial tension between the fracturing fluid and the petroleum oil under the abovementioned conditions of less than 0.07 mN/m or even 0.05 mN/m, preferentially less than 0.01 mN/m, and even more preferentially less than 0.005 mN/m. It is preferably targeted to obtain these ranges in the process of the invention under the conditions of implementation of step (E1), and more generally. More generally, the fracturing fluids according to the invention preferably comprise surfactants for which concentration, temperature and salinity conditions exist which make it possible to reduce the interfacial tension with a petroleum oil and/or with decane in the ranges defined in the present paragraph.

The extremely low interfacial tension between the fracturing fluid employed in the fracturing step (E1) of the process of the invention is capable of inducing a significant improvement in the co-flow of water and oil in the reservoir in step (E2), and consequently (i) a significant improvement in the flowback of the fracturing fluid, and (ii) faster and more durable production of oil during and after the flowback phase.

The present invention is not limited to the use of particular surfactants to afford the desired flowback aid effect, since they achieve the desired reduction in the interfacial tension between the fracturing fluid and the petroleum oil to be extracted.

By way of example, to lower the interfacial tension between the fracturing fluid and the oil, use may advantageously be made according to the invention of one or more anionic surfactants chosen from:
  anionic surfactants of sulfonate type,
    and notably:
      internal olefin sulfonates, of the type described notably in WO 2016/177817, for instance C19-C23 or C19-C24 olefin sulfonates
      alkylarylsulfonates, and notably alkyl benzene sulfonates, in which the alkyl group preferably includes at least 15 carbon atoms, for example between 15 and 24 carbon atoms, for instance an alkyl aryl sulfonate with a C15-18 alkyl
  anionic surfactants of alkyl sulfate type in which the alkyl group preferably includes at least 10 carbon atoms, for example between 10 and 16 carbon atoms, these alkyl sulfates preferably being alkoxylated, for example propoxylated and/or ethoxylated alkyl sulfates containing up to 10 ethoxy groups and/or up to 10 propoxy groups, for example propoxy-ethoxy sulfates comprising from 1 to 10 ethoxy groups and 1 to 10 propoxy groups, for instance an alkyl sulfate with a C12-13 alkyl group comprising 7 propoxy groups
  anionic surfactants of alkyl glyceryl ethoxy sulfonate (AGES) type, preferentially alkyl propoxy-ethoxy sulfonates, preferentially alkyl propoxy ethoxy sulfonates containing between 0 and 10 ethoxy groups and between 0 and 10 propoxy groups
  sulfosuccinates
  mixtures of these anionic surfactants.

According to an advantageous embodiment, use is made according to the invention of a mixture of a surfactant of sulfonate type of the abovementioned type (for example an alkyl benzene sulfonate) with an anionic surfactant of alkoxylated alkyl sulfate type, for example a mixture comprising from 40% to 60% of sulfonate and from 60% to 40% of alkoxylated alkyl sulfate. For example, a mixture comprising from 40% to 60% by mass of at least one C15-18 alkyl benzene sulfonate (alkyl benzene sulfonate in which the alkyl group includes from 15 to 18 carbon atoms) and from 60% to 40% by mass of a C12-13 7PO alkyl sulfate (alkyl sulfate with a C12-13 alkyl group comprising 7 propoxyl groups) proves to be particularly advantageous.

According to another embodiment, use is made according to the invention of a mixture of surfactants comprising from 40% to 60% by mass of alkyl benzene sulfonate and from 60% to 40% by mass of alkyl alkoxy sulfate.

According to yet another possible embodiment, use is made of a mixture of surfactants comprising from 40% to 60% by mass of an internal olefin sulfonate and from 60% to 40% by mass of alkyl alkoxy sulfate.

Alternatively, use may be made of a mixture of surfactants comprising from 40% to 60% by mass of alkyl benzene sulfonate and from 60% to 40% by mass of alkyl glyceryl alkoxy sulfonate.

According to yet another possible embodiment, use is made of a mixture of 40% to 60% by mass of an internal olefin sulfonate and from 60% to 40% by mass of alkyl glyceryl alkoxy sulfonate.

The abovementioned anionic surfactants may optionally be employed with:
  surfactants of amphoteric type, preferentially of betaine or sultaine type, more preferentially of betaine or sultaine type with alkyl chains comprising more than 12 carbon atoms; and/or
  nonionic surfactants, preferentially of ethoxylated alcohol type, for example of ethoxylated alcohol type with alkyl chain lengths comprising more than 12 carbon atoms.

The concentration of surfactant (or of surfactant mixture) in the fracturing fluid used according to the invention may vary to a certain extent as a function of the surfactants employed. Typically, however, this concentration remains between 0.5 and 8 g/L, for example between 1 and 4 g/L.

EXAMPLES

The examples which are given below and which illustrate possible embodiments of the invention and certain advantages thereof use the following products:

Surfactant mixtures according to the invention:
  Mixture 1: compound containing 50% by mass of alkyl benzene sulfonate with C15-16 alkyl chains; and 50% by mass of alkyl alkoxy sulfate with C12-13 alkyl chain lengths, comprising 4 propoxylate groups.
  Mixture 2: compound containing 50% by mass of an internal olefin sulfate (IOS) with a carbon chain length of between 19 and 23; and 50% by mass of an alkyl ether sulfate AES with an alkyl chain length of between C12 and C13 and 7 ethoxyl groups.
Model brine: in the examples below, this term denotes an aqueous medium with a salinity equal to 1.12 g/L TDS KCl, comprising in water: 1 g/L of NaCl; 0.1 g/L of $CaCl_2$; and 0.02 g/L of $MgCl_2$.
Fracturing products: in the examples below, this term denotes a mixture of Plexslick® 957 sold by Solvay (500 ppm); Plexslick® 957 sold by Solvay (250 ppm) and choline chloride (2 g/L), the values in parentheses corresponding to the contents in which these compounds are employed in the fracturing fluid tested.

Example 1

Interfacial Tension Obtained with a Surfactant Mixture According to the Invention In this example, Mixture 1 defined above was tested (50% by mass of alkyl benzene sulfonate with C15-16 alkyl chains; and 50% by mass of alkyl alkoxy sulfate with C12-13 alkyl chain lengths, comprising 4 propoxylate groups).

2 g of this mixture were introduced into a fracturing fluid comprising, in 1 L of water:
  17 g/L of potassium chloride; and
  the fracturing products (namely 2 g/L of choline chloride, 500 ppm of Plexslick® 957 and 250 ppm of Plexcide® 15G).

The interfacial tension between the fracturing fluid thus supplemented and decane, measured at 70° C. by the rotating drop method, is 0.004 mN/m.

For comparative purposes, the interfacial tension value obtained according to the same protocol for the flowback aid Stimoil ENX typically described in U.S. Pat. No. 9,068,108 as fracturing fluid additive of microemulsion type is much higher, namely equal to 0.96 mN/m.

Example 2: Imbibition Tests

Example 2.1: Imbibition Rate

In this example, the imbibition rates of a drop of aqueous formulation onto a carbonate rock (Lavoux) of preferential wettability with oil, in decane at a temperature of 70° C., were compared for the following various aqueous formulations:

Formulation 1: Mixture 2 (surfactant mixture according to the invention) at 8 g/L in a brine with a salinity equal to 95.2 g/L Formulation 2: Mixture 2 (surfactant mixture according to the invention) at 8 g/L in a brine with a salinity equal to 63.6 g/L Formulation 3: (control) the Model Brine with a total salinity equal to 1.12 g/L.

For each formulation, the imbibition rate was determined as follows:

The Lavoux carbonate rock (k~100 mD) was aged on contact with an Asab crude. After washing with cyclohexane and decane, its wettability is preferential with oil (contact angle of 160° of a drop of Model Brine on this substrate in decane at 70° C.).

One drop of the test formulation was then deposited on the rock thus obtained, immersed in decane at 70° C.

The change in the volume of the drop was then measured over time. More precisely, the ratio at a time t of the volume of the drop V(t) relative to the initial volume of the drop V(t=o) was determined over time. The measured ratio V(t)/V(t=0), known as the "normalized volume", measured at time t, decreases over time and reflects the degree of imbibition of the drop (the ratio is 1 at the start, when the drop is not at all imbibed into the substrate and it decreases thereafter, the value 0 corresponding to a state in which the drop has been totally imbibed into the substrate).

For Formulation 1, a normalized volume of 0.1 is obtained after 50 minutes, and this normalized volume is reached for Formulation 2 after 85 minutes, whereas with the control Formulation 3, which does not contain any surfactants according to the invention, the normalized volume remains greater than 0.7 even after 120 minutes.

The imbibition rate, expressed in $s^{-1}$, is given by the slope of the curve of the change in normalized volume as a function of time. It is, respectively, $33\times10^{-5}$ $s^{-1}$ and $18\times10^{-5}$ $s^{-1}$ for Formulations 1 and 2, as opposed to $3.0\times10^{-5}$ for the control Formulation 3.

These results clearly show that the imbibition is accelerated with the surfactant mixtures according to the invention. It should be noted that Formulation 1 corresponds to a brine employed in the salinity range close to the functioning optimum for the surfactant mixture employed (the salinity corresponds to 0.9 times the S* of Mixture 2), whereas Formulation 2 corresponds to a case that is more unfavorable in terms of salinity (0.6 times the S* of Mixture 2). It is seen that an advantageous effect remains observed even on straying from the optimum.

Example 2.2: Recovery of Oil by Imbibition (Rock of Very Low Permeability)

In this example, two fracturing fluids were used, denoted herein as F1 and F2, each comprising the surfactant Mixture 1 according to the invention at a concentration of 2 g/L in a brine comprising the fracturing products. The two fracturing fluids F1 and F2 differ only in their salinity: F1 has a salinity equal to the S* of Mixture 1 (16 g/L TDS KCl), whereas F2 has a salinity of 1.4 times this S*(23 g/L TDS KCl).

These fracturing fluids F1 and F2 which comprise additives according to the invention were tested for the extraction of an oil by imbibition. To do this, samples of Tavel rock of preferential wettability with oil and of very low permeability (2 to 7 μD) were immersed in a volume of 10 mL of fracturing fluid (F1 or F2, respectively), at 70° C., for seven days. The rock contains a percentage of water (Swi) of 49% for the two tests performed and a percentage of Asab crude (API° degree of 40), which is complementary, of 51%.

The quantification of the oil passing from the rock to the formulation was performed by analysis of the NMR signals of the rock samples in the initial state, and then after 3 days and 7 days of imbibition under the abovementioned conditions.

For the fluid F1, 34% of the oil was recovered in the fluid after 3 days and 47% of the oil passed into the formulation after 7 days.

For the fluid F2, in a quite similar manner, 31% of the oil was recovered after 3 days and 45% after 7 days.

These values of oil produced show a certain robustness of the efficiency of the compounds of the invention with respect to a variation in salinity.

As a guide, the interfacial tension between F1 and the oil is 0.004 mN/m.

Example 3: Improvement of the Flowback

In this example, a fracturing fluid was employed comprising Mixture 1 at a concentration of 2 g/L in a brine with a salinity of 17 g/L of KCl (corresponding to the optimum salinity (S*) of Mixture 1) and also containing the fracturing products.

This fracturing fluid was employed at 20° C. at a controlled injection rate, in a "coreflood" assembly (confinement pressure of 1500 psi) of the type described in "*An Integrated Workflow for Chemical EOR Pilot Design*" by Mikel Morvan, Brigitte Bazin, Frederic Douarche, and Rene Tabary; Society of Petroleum Engineers, 2010.

A rock of Kentucky carbonate type (7.6 cm long×3.8 cm in diameter, permeability between 0.12 and 0.25 mD) was employed, which was saturated with formulation at a constant rate. Isopar M was then injected into the rock thus saturated with formulation, at a constant rate of 0.5 mL/minute, and the pressure difference between the inlet and the outlet of the rock when the first oil drop comes out of the rock and the amount of water pushed by the Isopar out of the rock after 6 hours were measured.

The interfacial tension between the fracturing fluid employed and the Isopar M, as measured at 20° C. according to the rotating drop method, is 0.07 mN/m.

For comparative purposes, a control experiment was performed replacing the fracturing fluid with a solution of KCl at 5% in water.

With the control, the pressure is 300 psi when the oil begins to come out of the rock, whereas it is only 100 psi with the fracturing fluid according to the invention.

Moreover, with the control, 45% of the water is found to be evacuated from the rock after 6 hours, whereas the fracturing fluid according to the invention makes it possible to recover 60% thereof in the same time.

These two observations clearly illustrate the effect obtained with the additives according to the invention in terms of facilitated flow of the oil and more efficient removal of the water during the flowback.

The invention claimed is:

1. A process for extracting a petroleum oil contained in a geological formation, said process comprising
at least one step (E1) of fracturing said geological formation, by injection under pressure into said formation of an aqueous extraction fluid containing at least one surfactant, in which the at least one surfactant comprises a mixture of a surfactant of sulfonate type with an anionic surfactant of alkoxylated alkyl sulfate type, which lowers the interfacial tension between the aqueous extraction fluid-and the petroleum oil to be extracted below 0.1 mN/m under the conditions of contact between the petroleum oil and the fluid during step (E1); and then
a step (E2) of at least partial flowback of the petroleum oil and water out of the geological formation.

2. The process as claimed in claim 1, in which the interfacial tension between the extraction fluid and the petroleum oil to be extracted is below 0.05 mN/m.

3. The process as claimed in claim 1, in which said at least one surfactant is a mixture comprising:
from 40% to 60% by mass of alkyl benzene sulfonate and from 60% to 40% by mass of alkyl alkoxy sulfonate; or
from 40% to 60% by mass of an internal olefin sulfonate and from 60% to 40% by mass of alkyl alkoxy sulfonate; or
from 40% to 60% by mass of alkyl benzene sulfonate and from 60% to 40% by mass of alkyl glyceryl alkoxy sulfonate; or
from 40% to 60% by mass of an internal olefin sulfonate and from 60% to 40% by mass of alkyl glyceryl alkoxy sulfonate.

4. The process as claimed in claim 1, additionally comprising at least one of:
surfactants of amphoteric type; and/or
nonionic surfactants.

5. The process as claimed in claim 4, wherein the surfactants of amphoteric type are of betaine or sultaine type.

6. The process as claimed in claim 4, wherein the nonionic surfactants are of ethoxylated alcohol type.

7. A fracturing fluid which is suitable for performing the process of claim 1, which contains a surfactant or a surfactant mixture which make it possible to reduce the interfacial tension between the fluid and a petroleum oil below 0.1 mN/m.

8. The fracturing fluid as claimed in claim 7, wherein the interfacial tension of the fracturing fluid with decane is less than 0.1 mN/m at least at a temperature of between 70 and 120° C.

9. The fracturing fluid as claimed in claim 8, wherein the interfacial tension of the fracturing fluid with decane is less than 0.1 mN/m at least at 70.

10. The process as claimed in claim 1, wherein the surfactant of sulfonate type is an alkyl benzene sulfonate.

11. A method, comprising using, as a flowback aid, at least one surfactant, in which the at least one surfactant comprises a mixture of a surfactant of sulfonate type with an anionic surfactant of alkoxylated alkyl sulfate type, in an aqueous fracturing fluid, which is capable of lowering the interfacial tension of the aqueous fracturing fluid with decane and/or hexadecane below 0.1 mN/m.

12. The method of claim 11, wherein the at least one surfactant is capable of lowering the interfacial tension of said fluid with decane and/or hexadecane below 0.1 mN/m at least at a temperature of between 70 and 120° C.

13. The method of claim 11, wherein the at least one surfactant is capable of lowering the interfacial tension of said fluid with decane and/or hexadecane below 0.1 mN/m at least at 70° C.

* * * * *